United States Patent
Yamamoto et al.

[11] Patent Number: 5,865,466
[45] Date of Patent: Feb. 2, 1999

[54] AIR BAG DEVICE

[75] Inventors: Tadashi Yamamoto, Aichi-ken; Masanari Sakamoto, Nagoya; Kenji Mori; Chisato Masuya, both of Gifu, all of Japan

[73] Assignee: Toyoda Gosei Co., Ltd., Nishikasugai-Gun, Japan

[21] Appl. No.: 880,541

[22] Filed: Jun. 23, 1997

[30] Foreign Application Priority Data

Jun. 21, 1996 [JP] Japan .................................. 8-161303

[51] Int. Cl.$^6$ .................................................. B60R 21/16
[52] U.S. Cl. ...................................... 280/743.1; 280/743.2
[58] Field of Search .......................... 280/728.1, 743.1, 280/743.2, 731

[56] References Cited

U.S. PATENT DOCUMENTS

| | | | |
|---|---|---|---|
| 5,004,266 | 4/1991 | Miller et al. | 280/743.2 |
| 5,393,090 | 2/1995 | Shepherd et al. | 280/743.1 |
| 5,531,477 | 7/1996 | Madrigal et al. | 280/743.1 |
| 5,562,301 | 10/1996 | Lutz | 280/731 |
| 5,727,811 | 3/1998 | Nagata et al. | 280/731 |

FOREIGN PATENT DOCUMENTS 7-277124  10/1995  Japan .

*Primary Examiner*—Paul N. Dickson
*Attorney, Agent, or Firm*—Pillsbury Madison & Sutro LLP

[57] ABSTRACT

The air bag device comprises a folded air bag which can be expanded by gas. The air bag is wrapped with a breakable band during folding. Thus, amount, rate and direction of expansion of the air bag can be regulated and controlled during the initial stages of deployment.

13 Claims, 3 Drawing Sheets

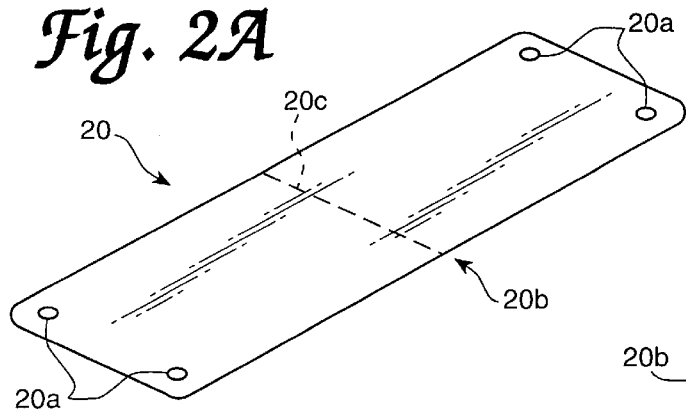
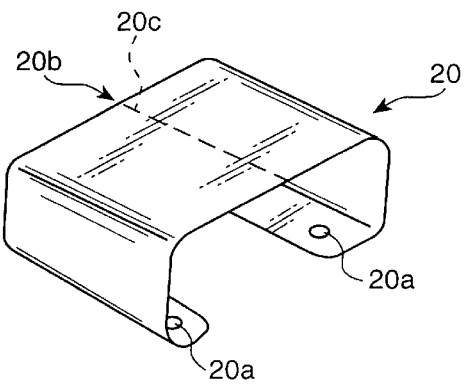
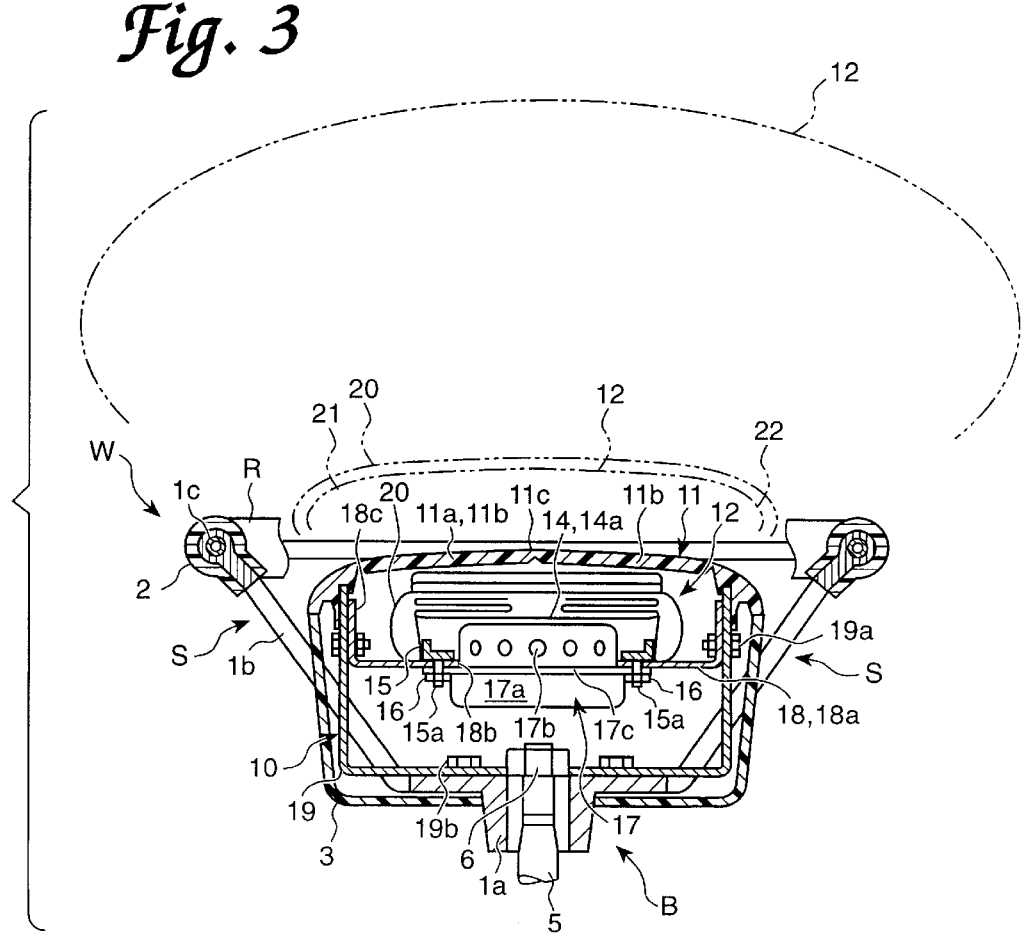

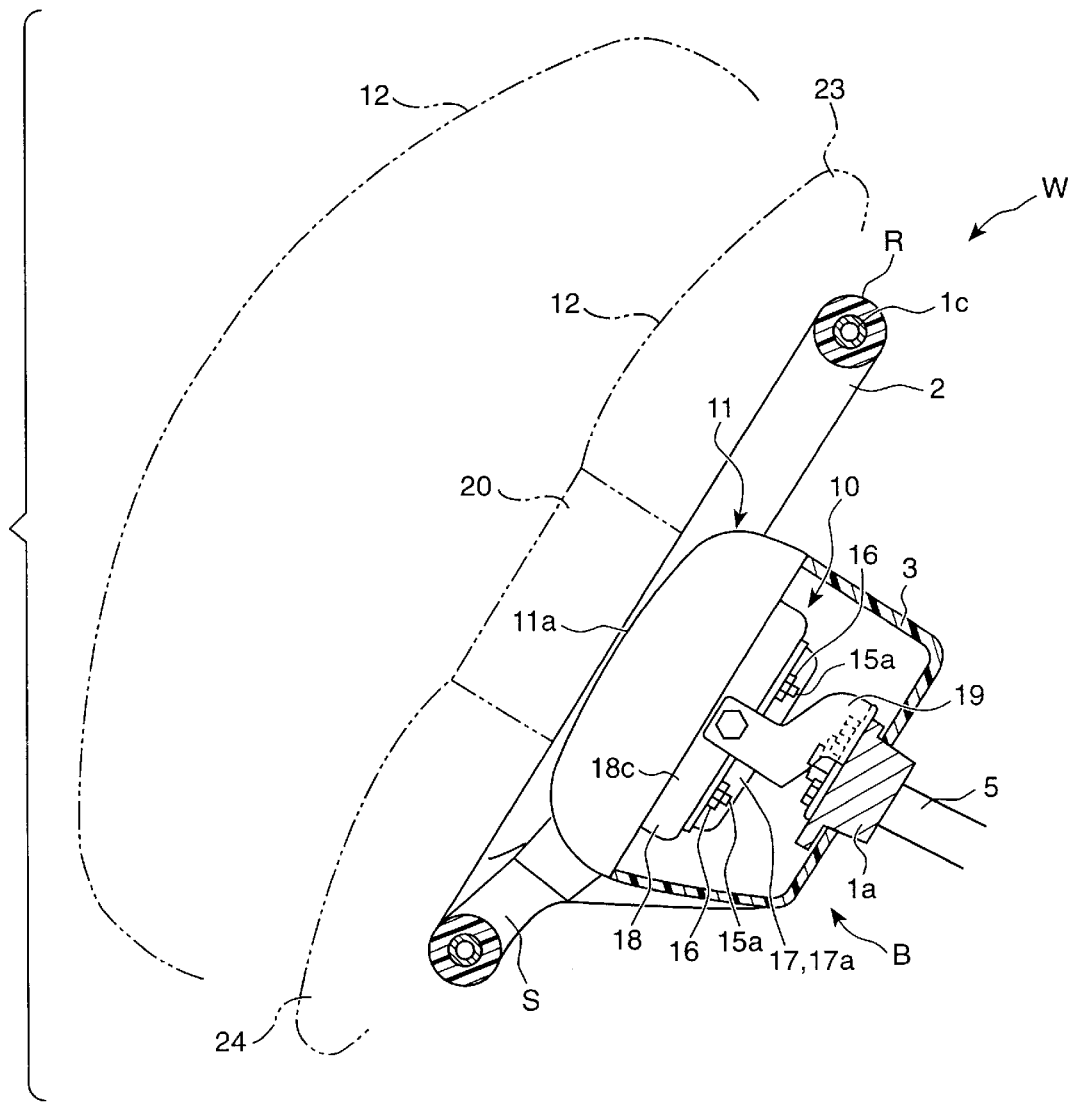

AIR BAG DEVICE

The following priority application, Japanese Patent Application No. hei 8-161303, filed in Japan on Jun. 21, 1996, is hereby incorporated by reference into the present specification.

BACKGROUND OF THE INVENTION

1. Field of the Invention

This invention relates to an air bag device, and more particularly to an air bag in which the initial stages of expansion can be regulated, specifically to be blocked from interfering with a driver's arms during the initial stage of air bag deployment.

2. Description of Related Art

One example of the use of a tether inside a conventional folded air bag, to regulate the initial stage of expansion, is shown in Japanese Patent Laid Open No. hei-70277124. The tether is very short and breakable, so that the mount of projection in the initial stage of expansion is very short.

However, when such a tether is short, the manufactured steps of such air bags are very difficult. For example, reversing the air bag after seaming the tether on the reverse side of the air bag is difficult because the tether is located inside air bag and is attached to inside air bag surface by seaming.

SUMMARY OF THE INVENTION

An object of the present invention is to provide an air bag device in which a shorter quantity of the projecting air bag is controlled in the initial stage of expansion and is easily regulated.

The air bag device is received with a folded air bag which is expanded by gas. The air bag is wrapped with a breakable band around its middle and is folded. When folding the air bag orthogonally to change the folding direction thereof, the band is preferably wrapped on the air bag before changing the folding direction.

When the folded air bag is expanded, expansion of the air bag is regulated by the band which wraps the air bag. Then, the band is fractured and the air bag continues expansion into its shape when completely expanded. Thus, until the band is fractured the expansion speed of the air bag is throttled.

Even if the band is relatively short, to obtain a limited projecting quantity of the air bag in the initial stage of air bag expansion or deployment, the band is easily wrapped about the partially folded air bag.

During folding the folding direction of the air bag is changed so that the last folding is orthogonal to the initial folding direction. The band is wrapped about the air bag before changing the folding direction of the air bag. Consequently, the amount, rate and direction of expansion during the initial stage of deployment can be regulated by the band wrapped about the air bag. Therefore, the air bag device of the present invention can be regulated to control the projection quantity in the initial stage of expansion as well as the expansion rate and the direction taken by the deploying air bag.

BRIEF DESCRIPTION OF THE DRAWINGS

FIGS. 2A and 2B are schematic views of a band;

FIG. 3 is a cross-sectional view of an air bag assembly in a steering wheel; and FIG. 4 is a schematic cross-sectional view of the embodiment.

DETAILED DESCRIPTION OF THE PREFERRED EMBODIMENT

Figure 1A:
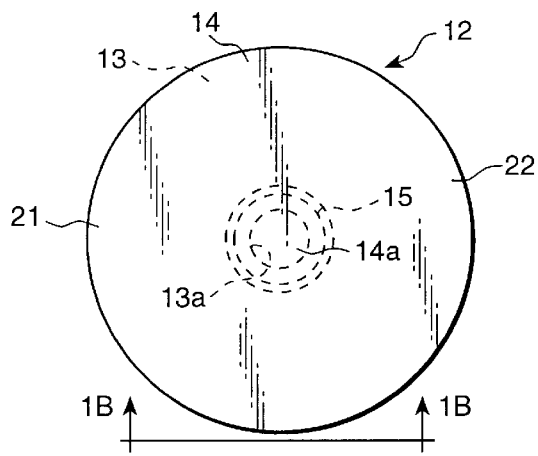
FIGS. 1A–1H show the folding sequence of an air bag according to the present invention, as well as end views of such stages.

As shown in FIGS. 3 and 4, an air bag device 10, according to a preferred embodiment of the present invention, is used at the center of a steering wheel W mounted on a boss B.

The steering wheel W comprises a circular ring R, the boss B located at the center of the ring R and spokes S connected between the boss B and the ring R. Each portion of the steering wheel W has a core member. A ring core 1c and a part of a spoke core 1b of the steering wheel W are each covered with a cover layer 2. A boss core 1a of the steering wheel W is cover with a lower cover 3. The boss core 1a is fastened on a steering shaft 5 by a nut 6.

The air bag device 10 comprises an outer covering pad 11, located at an upper part thereof, a folded air bag 12, an inflator 17, a bag holder 18 holding with the pad 11, and a bracket 19 that fastens the air bag device 10 on boss core 1a. The air bag device 10 is fixed on near the boss core 1a by bolts.

Pad 11 includes an upper wall 11a with the periphery thereof being fixed to the bag holder 18. The pad includes a tear portion or seam 11c, torn open by the expanding air bag, with the tear portion having a thinner structure than the general thickness of upper wall 11a. Doors 11b are surrounded and defined by the tear portion 11c. During expansion of the air bag 12, the tear portion 11c is torn by the force of the air bag 12 and doors 11b are opened about suitable hinges where there is no tear or thinned portion.

Inflator 17 comprises a cylindrical main body 17a having openings 17b for jetting gas and a support flange portion 17c extending outwardly from the main body 17a. Flange 17c includes suitable holes to allow attachment to the bag holder 18 by bolts 15a.

Bag holder 18, made of metal, comprises an oblong bottom wall 18a and four side walls 18c that extend from the periphery of bottom wall 18a. Bottom wall 18a has a central insert opening 18b through which is inserted the main body 17a from under the bottom wall 18a upwardly. The side walls 18c are fixed to pad 11 by rivets (not shown).

Bracket 19, made of metal and having U-like shape, is connected to side walls 18c of the bag holder 18 by any convenient means, such as bolts 19a. Also, bracket 19 is connected to the boss core 1a by bolts 19b.

Figure 1E:
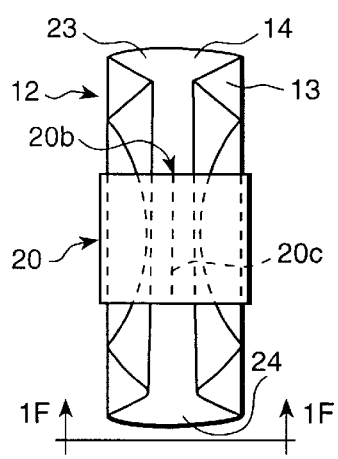
Figure 1B:
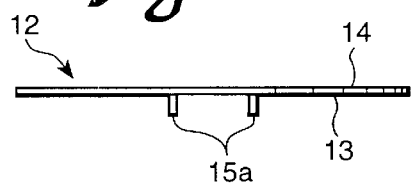

As shown in FIGS. 1A, 1B and 3, the air bag 12 comprises a circular bottom portion 13 having a gas inflow hole 13a at the center thereof and a circular upper portion 14. Both the bottom portion 13 and the upper portion 14 are made of fabric and are coated with a heat resistant coating on the inside thereof. The main structure of air bag 12 is formed by sewing about the periphery of each of the bottom portion 13 and the upper portion 14.

The air bag 12 is assembled on the bag holder 18 about the inflator 17. Assembling of the air bag 12 includes use of a retainer 15 having four bolts 15a which are located around the gas inflow hole 13a. Each bolt 15a is inserted into holes provided around the gas inflow hole 13a and the retainer 15 is itself located within the air bag 12. Then, each bolt 15a are inserted through insert holes 18b and holes 17d and are fastened by nuts 16. In this way the bag holder 18 is assembled with the air bag 12 and inflator 17.

The air bag 12 is folded after the retainer 15 is located and received therein. Also, the air bag which is folded in the middle way is wrapped with a band 20.

The band 20 is, for example, made of polyamide fabric. As shown in FIG. 2, each end of band 20 includes two fixing holes 20a which are engaged by the bolts 15a. Also, band 20 has a weakened portion 20b in which one or more slits 20c are formed at the center, so that the band 20 can be broken easily. The length of the band 20 is such that it allows for the wrapping about the middle of the partially folded air bag 20 as shown in FIGS. 1C-1F. When deployment of the air bag 20 begins, the length of band 20 allows some degree of outward movement of air bag 17. Band 20 is not initially broken but permits the air bag 12 to move sufficiently to break the tear portions 11c and to open doors 11b. Outward movement continues and as doors 11b open the portions of air bag 12 that overlie band 20 will begin to deploy in the direction they are designed to move. In this way band 20 is restricting the speed rate of expansion as well as the initial direction of air bag movement.

Further outward movement will tension band 20 and eventually band 20 will break, thus releasing the remainder of air bag 20 which then fully expands.

Consequently, band 20 has helped regulate the expansion rate and direction of air bag 12 as well as the degree of expansion through a series of stages of deployment thereof.

The procedure for folding air bag 12 is as follows.

First, as shown in FIGS. 1A and 1B, the air bag 12 is spread out flat and the upper portion 14 is wrapped over the bottom portion 13. Then, as shown in FIGS. 1C and 1D, symmetric portions 21 and 22 of the peripheral edges of the air bag 12 are folded inwardly to form an accordion-like crease on the upper portion 14 at a center of which is the gas inflowing hole 13a.

Figure 1F:
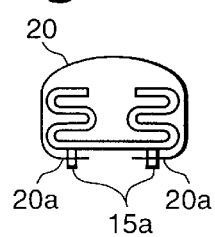
Figure 1C:
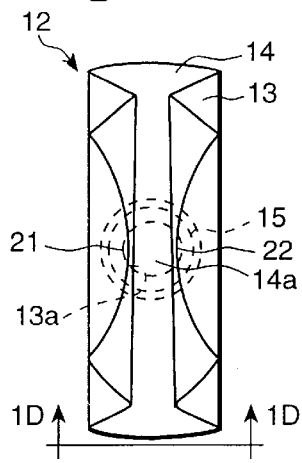

Next, as shown in FIGS. 1E and 1F, each fixing hole 20a of the band 20 are placed over bolts 15a of the retainer 15 and the center of the thus folded air bag 12 is wrapped with the band 20.

Figure 1G:
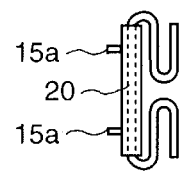
Figure 1D:
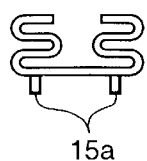
Figure 1H:
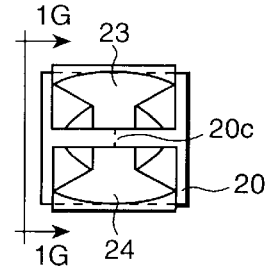

Then, as shown in FIGS. 1G and 1H, symmetric portions 23 and 24 of the peripheral edges of the folded air bag 12, shown in first step, are folded to create another accordion-like crease on the upper portion 14 and across the center of the gas inflowing hole 13a. This folding direction of this step is orthogonal or at 90° to the first folding step. This completes the folding procedure.

The folded air bag 12, together with the inflator 17, is assembled to the bottom wall 18a in the bag holder 18 by bolts 15a as noted above. The placing direction of the folded air bag 12 is in a right-to-left direction relative to the first folded symmetric portions 21 and 22.

Then, the pad 11 is fixed on the bag holder 18 with the folded air bag 12, and the air bag device 10 is assembled.

The air bag device 10 is attached on the steering wheel by using the bracket 19. When the inflator 17 is discharged, gas generated from the inflator 17 is emitted from openings 17b and the air bag 12 expands. The center portion 14 of the upper portion 14 then moves outwardly. The air bag 12 breaks the tear portions 11c of the upper wall 11a and opens the doors 11b. Finally, the air bag 12 moves outwardly beyond the pad 11.

As the air bag 12 expands, as shown in FIGS. 3 and 4 by dotted lines, the right-and-left and front-and-back directions of expansion of the air bag 12 are temporarily restricted by band 20 and the air bag 12 first expands only in an up-and-down (or top-and-bottom) directions. Then, after band 20 breaks, air bag 12 will fully expand.

Thus, until the band 20 is broken, the expansion speed is reduced.

The band 20 is placed on the air bag during the process of folding the air bag after sewing is completed. The shorter band is easy to use, and expansion of the air bag in an initial stage can be both small and controlled.

Additionally, without changing the size of the air bag 12, the expansion speed and direction of the air bag 12 is easily changed by changing the character of the band, that is, changing the material, its length, width, and/or thickness, and/or changing the position of the band 20 or modifying the folding the air bag 12.

In addition, since the air bag 12 is preferably finally folded orthogonally about the band 20 and the band 20 wraps the intermediate part of the partially folded air bag 12 before changing the folding direction, expansion during the initial stages of deployment can be controlled at the portion of the air bag 12 which is folded prior to changing folding direction. Thus, both the degree of expansion during the initial stage of deployment, as well as the expansion direction can be controlled.

The direction at which the wrapped band 20 is positioned relative to the steering wheel W is in a right-to-left manner and the air bag 12 is not restricted at a front and back direction relative to the steering W. Thus, before band 20 breaks, the air bag 12 is restricted in a right-and-left direction and will not interfere with the arms of a driver which may be holding the steering wheel W during the initial stage of air bag expansion.

In addition, the exact way of folding the air bag 12, as well as the direction of and the area about which the band wrapped around the air bag 12, are discretionary.

For example, in the case shown in FIGS. 1C and/or 1H, symmetric portion 21, 22, 23 and/or 24 can be folded by rolling instead of folding.

The air bag 12 is folded at symmetric portions 23 and 24 first. Then, the band 20 wraps about the intermediate portion of folded air bag 12 in front and back direction as shown in end view FIG. 1F.

The precise area that is wrapped by band 20 can be changed by varying the width of band 20.

In addition, restriction of the expansion point can be controlled according to a point of wrapped with the band 20. For example, in step of folding the air bag 12 as shown in FIG. 1C, after folding the several folds comprising the symmetric portions 21 and 22, the thus partially folded air bag 12 is wrapped by band 20. Then the symmetric portions 21 and 22, together with the band 20, are folded again. Then, the symmetric portions 23, 24 are folded as shown in FIGS. 1H and 1G.

The band 20 can be sewn about the periphery of the gas inflowing hole 13a by sewing or band 20 can be fixed to the bottom wall 18a of the bag holder 18. Then, when the band 20 is broken at the weak portion 23, the band 20 does not fly off.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An air bag device comprising:

a pad;

an air bag holder;

an air bag located between said pad and said air bag holder; said air bag being folded in a first folded position and having a breakable band wrapped around a central portion of the folded air bag in said first folded position, wherein at least a portion of said air bag is further folded in an orthogonal direction over said breakable band to form a second folded position.

2. The air bag device according to claim 1, wherein said breakable band is fixed to said bag holder.

3. The air bag device according to claim 1, wherein said breakable band includes a slit to direct breaking.

4. The air bag device according to claim 1, wherein said air bag includes a gas inflow hole and said breakable band has a width that is at least as great as the diameter of said gas inflow hole.

5. The air bag device of claim 1, wherein said breakable band has a length, wherein said length allows a partial outward movement during a deployment of said airbag before said band breaks.

6. The air bag device of claim 1, wherein said breakable band has a weakened portion so that said band can be broken at the weakened portion.

7. An air bag device comprising:

a pad;

an air bag holder;

an air bag located between said pad and said air bag holder; said air bag being folded orthogonally at a first pair of opposite lateral edges of said air bag to define a first folded position;

a breakable band wrapped around a central portion of said air bag in said first folded position;

said air bag orthogonally folded over at least a portion of said breakable band by a second pair of opposite lateral edges of said air bag to define a second folded position.

8. The air bag device of claim 7, wherein said breakable band has a length, wherein said length allows a partial outward movement of said airbag during a deployment of said air bag before said band breaks.

9. The air bag device of claim 7, wherein said breakable band restricts a rate of speed of expansion and an initial direction of air bag movement when said air bag is deployed.

10. The air bag device of claim 7, wherein upon deployment of said air bag, said breakable band causes the deployment to occur in at least three stages, wherein said first stage comprises expansion of said bag, said second stage comprises breaking of said band, and said third stage comprises further expansion of said bag.

11. The air bag device of claim 7, wherein in said second folded position of said air bag, said breakable band is embedded in said folded air bag.

12. An air bag and breakable band assembly comprising:

an air bag; and a breakable band, wherein said air bag is folded in a first folded position and wherein said breakable band is wrapped around a central portion of the folded air bag in said first folded position, and wherein at least a portion of said air bag is further folded in an orthogonal direction over said breakable band to form a second folded position.

13. The air bag and breakable band assembly of claim 12, wherein said breakable band has a length, wherein said length allows a partial outward movement of said airbag during a deployment of said air bag before said band breaks.

* * * * *